Oct. 3, 1939.   C. W. ABBOTT   2,175,099
METHOD AND APPARATUS FOR PRODUCING COATED RUBBER-INSULATED CONDUCTORS
Filed April 22, 1939

INVENTOR
CHARLES W. ABBOTT.
BY William T. Kneisner
ATTORNEY

Patented Oct. 3, 1939

2,175,099

UNITED STATES PATENT OFFICE 2,175,099

METHOD AND APPARATUS FOR PRODUCING COATED RUBBER-INSULATED CONDUCTORS

Charles W. Abbott, Larchmont, N. Y.

Application April 22, 1939, Serial No. 269,349

18 Claims. (Cl. 18—13)

This invention relates to a method and apparatus for producing vulcanized rubber products with a coating on the rubber and more particularly for producing coated rubber-insulated conductors, for example, flexible rubber-covered conductors known as "lamp cord".

One of the objects of this invention is to provide a simple and practical method and apparatus for producing rubber-covered conductor with a coating, such as a finish coating, thereon, capable of producing dependable and durable results at high speed, high efficiency and low cost. Another object is to provide a method and apparatus for achieving a durable and dependable bond between the rubber and the coating, together with such flexibility and stretch of the coating as will insure integrity and long life of construction throughout the widely varying conditions, including flexing, to which the rubber, such as that of the rubber-insulated flexible cord, is subjected in practical use.

Another object is to provide a method or apparatus for achieving the production of a coated rubber-insulated conductor or of a coated rubber jacket or covering for a conductor that will dependably overcome many of the disadvantages and shortcomings inherent in present-day practices or practices heretofore known for applying a coating, such as a finish coating, to such a rubber product. According to such practices, the rubber-covered conductor, after having a coating material, usually a lacquer, applied to the external surface of the rubber, is then subjected to tedious, cumbersome, inefficient and usually expensive drying methods or treatments, usually employing a so-called drying tower in which the conductor, usually in relatively great lengths, is run back and forth, as on pulleys or like guides, while suitable means are employed to change the air or atmosphere surrounding the conductor in the drying tower, sometimes accompanied by the application externally of heat, in the effort to hasten the slow and time-consuming process of drying the coating. By way of contrast, one of the dominant aims of this invention is to provide a method of producing a coated-rubber-insulated conductor or coated-rubber conductor-jacket in which such cumbersome and disadvantageous drying methods and apparatus can be safely eliminated and in which the application of the coating is followed by substantially instantaneous drying action. Another object is to provide a method of producing such coated-rubber products as those above-mentioned that will achieve substantial economies in operation and substantial improvement in resultant product. Another object is to provide a method of the above-mentioned nature capable, in a dependable, inexpensive and efficient way, of producing rubber products with a pigmented coating capable of embodiment in a wide variety of colors.

Another object is to provide a method of achieving a strong, durable and clean union between the surface rubber and the coating. Another object is to provide a method and apparatus for producing coated-rubber products in which cracking or crazing of the coating during flexing or stretching of the rubber base is dependably counteracted or negatived, and thus, also, greater permanence of bond between coating and rubber base achieved. Another object is to provide a method of the above-mentioned nature that may be efficiently carried on in practice and also capable of being readily and at low cost incorporated into or with existing methods or equipment utilized in the manufacture of insulated conductor.

Other objects will be in part obvious or in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawing, in which is shown by way of illustration one possible embodiment of certain of the mechanical features of my invention, Figure 1 is a diagrammatic representation of an apparatus by which my method may be carried on;

Figure 2 is a cross-sectional view on an enlarged scale showing a preferred form of application chamber and supply therefor of the coating material;

Figure 3 is an elevation on an enlarged scale, certain parts being omitted, of an apparatus for carrying on one of the steps of my process, and Figure 4 is a cross-sectional view on a greatly enlarged scale of a form of coated-rubber-insulated conductor construction which my process is capable of producing.

Similar reference characters refer to similar parts throughout the several views in the drawing.

Figures 1, 2, 3, 4:
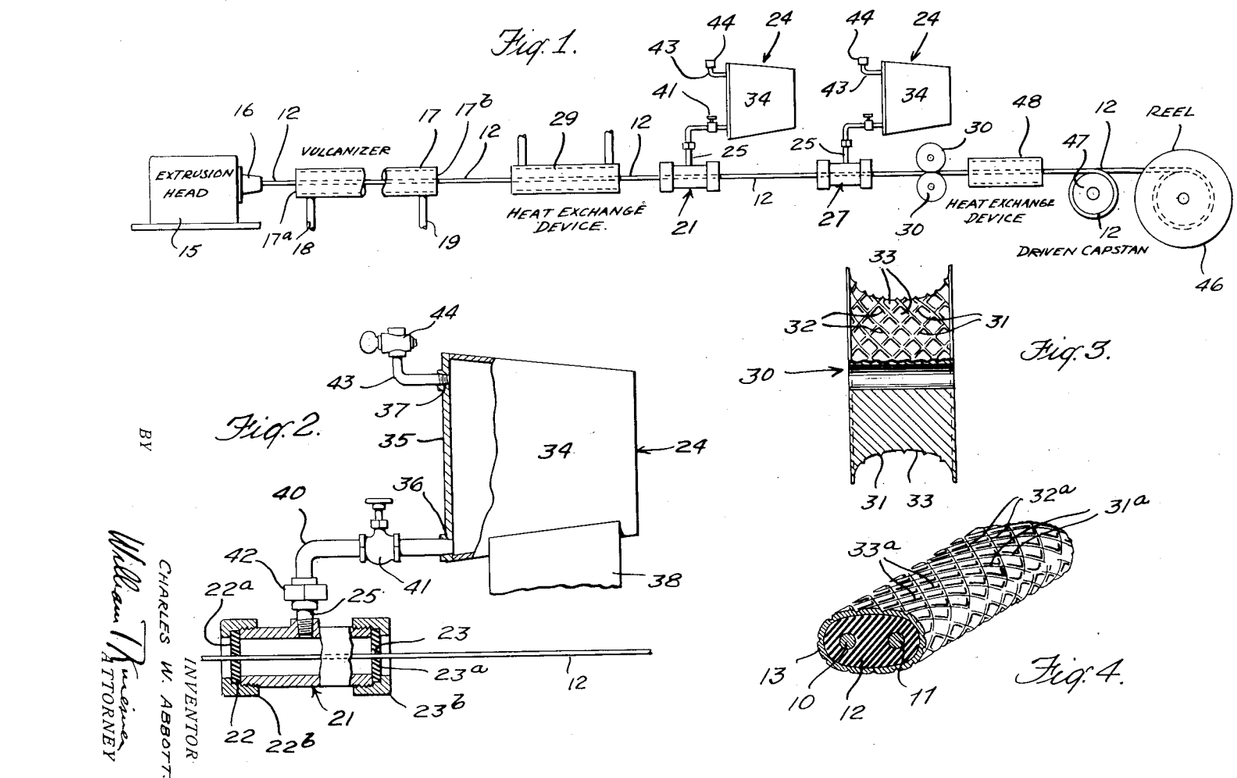

By way of illustration, let it be assumed that a coated-rubber covering or jacket for electrical conductors is to be constructed and that it might take the illustrative form shown in Figure 4 where, as in a lamp cord, two conductors 10 and 11 are to be covered with or enclosed by a mass of rubber in the form of a suitable jacket, as is indicated at 12, and that the jacket or rubber insulation is to be provided with a suitable coating 13. Referring now to Figure 1, I preferably provide a suitable extrusion head or apparatus diagrammatically indicated at 15 which in any suitable way, and as is well known in the art, is provided with a die of suitable configuration and with suitable means to force an appropriate rubber mixture or compound through the die and thus give it the cross-section, illustratively like the cross-section of the part 12 of Figure 4, that is desired and to which the die orifice conforms. If desired, and particularly where the construction is to be in the form of lamp cord, or the like, the extrusion apparatus 15 is suitably constructed to feed the two conductors 10—11 from a suitable source of supply through or into the die, in suitable spaced relation, so as to extrude the rubber compound directly onto and about the conductor or conductors.

It is to be understood, of course, that the above-described form of conductor construction and as shown in Figure 4, is only illustrative of one form of insulated conductor having an outer jacket of rubber capable of being extruded onto or about the internal conductor or conductors and that it can take any other suitable or desirable form, for example, of the type in which an already insulated conductor (or conductors) is to have an outer rubber jacket extruded thereon. The term "rubber jacket" or "rubber covering" I therefore wish to be broadly understood, since, in so far as certain features of my invention are concerned and as just indicated, the cross-sectional shape or configuration or the internal construction or arrangement of parts with respect to the jacket or covering may be widely varied.

In Figure 1, the extrusion apparatus 15 may thus be considered as having a suitable die, as above-mentioned, indicated diagrammatically at 16, and from it emerges the extruded jacket 12 which I then pass at once and directly into one end of a suitable vulcanizing chamber of suitable length and construction and supplied in any suitable way with a heating medium for subjecting the rubber to a suitable vulcanizing temperature to effect its vulcanization.

This vulcanizing chamber may take any suitable form but preferably it is in the form of a long pipe-like cylindrical tube, suitably heat-insulated externally and connected, as by pipes 18, 19, to a suitable source of steam; the end walls 17ª and 17ᵇ of the chamber are constructed in any suitable way, as by appropriate sealing means, analogous to glands or stuffing boxes, to permit entry and exit therethrough of the jacketed conductor without material loss of heating medium or steam and to permit movement through the vulcanizing chamber 17 at suitable speed. More specifically, the just described construction may be considered to be diagrammatically representative of the commercial form of vulcanizer, known as the "continuous vulcanizer".

With such a continuous vulcanizer, the jacketed conductor may be drawn through it as fast as the extrusion apparatus 15 emits the extruded construction from its die 16 and for purposes of illustration the speed or rate of movement of the extruded jacket may be one hundred and twenty-five feet per minute. To such a speed of movement, and in accordance with known practices in such continuous vulcanization, the pressure and hence temperature of the steam supply and the length of the chamber 17 are mutually interrelated and accordingly the jacketed conductor emerges from the discharge end 17ᵇ of the continuous vulcanizer 17 with the rubber jacket vulcanized but at a relatively high temperature and with a substantial heat content to which the heat stored in the conductor or conductors (if the latter are present) may contribute. But also, the external or exposed surface of the rubber of this emerging vulcanized structure is clean, free from foreign matter, and has certain other characteristics later referred to.

The temperature and heat content of the structure emerging from the vulcanizing chamber may vary or may be varied according to circumstances. Thus, the heat content may vary according to the mass of rubber and characteristics of other parts, such as the conductor or conductors or initial insulation about the conductors, if the jacket is extruded onto a conductor or conductors, and temperature and heat content may vary or may be varied according to the temperature and heat conditions within the vulcanizing chamber; the latter is usually supplied with steam at suitable pressure and it is hence through such a heating medium that the extruded rubber structure is drawn, the pressure, and hence temperature of the steam, being varied, if necessary or if desired, according to the factors of speed of movement and the mass of rubber to be vulcanized. These factors or variables may be controlled in accordance with known practices in operating the step of continuous vulcanization and for purposes of illustration let it be assumed that the illustrative conductor structure of Figure 4, substantially an elongated oval in cross-section, has a major axis of about one-quarter of an inch and a minor axis of about one-eighth of an inch and that, at the above illustratively mentioned speed of one hundred and twenty-five feet per minute, it emerges from the continuous vulcanizing step at a temperature of about 325° F.

Then I pass the rubber-jacketed structure through an application chamber 21 which is preferably relatively small and which hence and preferably contains a relatively small quantity of the coating material in semi-liquid or semi-plastic form, the chamber 21 taking any suitable form, for example, like that shown in Figure 2, being provided with an entry opening 22 and an exit opening 23 to permit the moving rubber structure 12 to be passed through the interior of the chamber 21 and hence through the mass of coating material contained therein.

The entry and exit openings 22 and 23 may be of any suitable conformation or construction so that the entry opening 22, in its relation to the moving member 12, prevents leakage or loss of the coating material, and so that exit opening 23 permits the passage through it of the rubber member 12 with a coating of the coating material thereon of the desired thickness. Thus, the exit end 21 may have any suitable construction or arrangement to function like a "doctor" or "wipe", thus to guard against the application of the coating material in a layer of excessive thickness. This may be achieved in any suitable or known way. Preferably, the end wall 23ª is made of rubber, replaceably mounted as by a threaded collar 23ᵇ, and having the exit opening 23 of the same cross-sectional shape as that of the member 12 but larger than the latter by an amount substantially equal to the thickness of the layer, taking into consideration, of course, such factors as the degree of viscosity of the coating material in the chamber 21 and the speed at which the rubber member is drawn therethrough. The entry end preferably also comprises a rubber wall member 22ª replaceably mounted as by a threaded collar 22ᵇ and having therein the entry opening 22. Thus, also, the end walls may be readily replaced if the walls of the opening wear or, by way of further example, to provide openings of different shape or cross-section to suit the cross-section of the rubber element to be coated.

As above noted, I prefer that the application chamber 21 be relatively small so that it contains only a small quantity of coating material and hence I provide suitable means for feeding coating material, as by a gravity feed, to the application chamber 21. Such means may comprise a suitable container 24 connected to the application chamber 21 in any suitable way, as by a conduit or pipe 25. It preferably, however, takes a form later described, a readier understanding of which follows after certain other features of my process are more fully described.

With such an arrangement, therefore, the rubber member or jacket enters the application chamber 21 at a relatively high temperature and with a substantial heat content, as earlier above explained, and illustratively its temperature, as already noted by way of example, may be 325° F.; in that condition also, but now with a coating on its surface, it emerges from the application chamber 21, since its high speed of movement and the small mass of the coating material through which it passes but inappreciably or only to a minor extent affect its temperature and heat content as it emerges. The coating material in the supply container 24 may be at room temperature though the temperature of the coating material within the application chamber 21 may be to a greater or less extent above room temperature, due to the transfer of some heat thereto from the heated and rapidly moving rubber mass.

The coating material is acted upon by the heat content of the mass which it now envelopes, that action taking place immediately upon the emergence of the coated rubber from the application chamber 21 and preferably an exceedingly rapid setting of the coating is made to take place by such coactions between the coating material and the heat content and, to illustrate, I may achieve a suitable setting in such short space of time as is needed to effect a travel of the coated material of, for example, six inches, one foot, two feet, or three feet, or more, according to the results desired, from the point of emergence from the application chamber. Thus, I may effect somewhat delayed setting so as to cause a greater distance of travel from the point of application, say four feet, for example, where, for example, the tacky or externally effective adhesive quality of a coating material (prior to complete setting) is desired to be utilized, as by application thereon, within the travel of four feet, of another covering.

For example, it may be desired to superimpose upon the first coatings one or more additional coatings or layers, and in that case as many more application chambers, illustratively one more as at 27 in Figure 1, may be alined along the path of movement of the member 12; in superimposing a coating upon an existing coating, the base or immediately underlying coating upon which the additional one is to be applied, is preferably completely "set" and in such case, the second application chamber 27 is preferably spaced from the preceding one, such as chamber 21, by a distance about equal to the distance of travel required to complete the setting of the base layer. For example, suppose that the base layer is substantially completely set, under the conditions of temperature and heat content of the moving member 12, in the time interval corresponding to a travel of two feet; the spacing between the successive application chambers may hence be in the neighborhood of two feet. The solvent in the coating material of the superimposed layer softens up the skin of the underlying layer sufficiently to insure a good bond.

The coating material that may be used in my process may vary widely in composition and any compound or composition may be employed that is capable of appropriate coaction with the heat content of the rubber member at the particular temperature of the latter and that is capable, after such coaction or heat treatment, of providing suitable adhesion to the rubber and suitable flexibility to be capable, without detrimental rupture or cracking, of bending and stretching and contracting with the rubber insulated conductor itself. Since, as already indicated above, the conditions of operation in practice may vary, the coating material or compound is selected or, as to its ingredients or composition, varied or changed accordingly; I find, therefore, that there is considerable latitude available in the choice or selection of a coating material, as well as in the ingredients or proportions of ingredients of any one selected coating material. And accordingly, I will set forth, by way of illustration, one form of coating material and its composition to illustrate how the above-mentioned coactions with the rubber jacket and with the heat content of the member being coated are brought about, to the end that the principles of my process may be more fully understood and to the end that those skilled in the art will readily perceive how to suit the coating material to the conditions of operation.

An illustrative compound to employ is a lacquer whose ingredients are suited or selected according to their characteristics and the particular conditions under which the process is to be carried on; for example, the conditions might be those illustratively referred to above, namely, the rubber article is that above described in connection with Figure 4, its rate of movement or travel is say one hundred and twenty-five feet per minute and its temperature upon emergence from the continuous vulcanizing chamber 17 is on the order of 325° F. For these conditions I employ a lacquer having for its base a cellulose derivative, preferably cellulose nitrate, and having included therewith a suitable solvent and a suitable plasticizer.

In compounding the lacquer, therefore, I employ nitro-cellulose, a suitable plasticizer, with a suitable solvent; the solvent may be and preferably does comprise a number of solvents having different rates of evaporation under substantially the same temperature or heat conditions, where, as in the preferred case, it is desired to achieve progressive or graduated evaporation of the solvent and hence progressive setting action of the coating. In this illustrative example, the solvents used are selected with respect to the above-mentioned illustrative temperature of 325°

F., the temperature of the member 12 at the time of application of the coating. There are numerous substances available to function as solvents, as is well known in the art; an illustrative mixture of solvents is later set forth.

As for the plasticizer, like the solvents, where nitro-cellulose is employed as a base, there are numerous substances available, as is well known in the art. The plasticizer is selected according to the degree of flexibility which the ultimate coating is intended to have and according to the desired degree of adhesion of the coating to the rubber. In the illustrative example of lacquer, the plasticizer may be a non-drying alkyd.

Preferably, also, a pigment is included and that may take any suitable form, such as any of the so-called "dry color materials", known in the art. In accordance with known practice in the art, the percentage of plasticizer utilized may be made to vary according to the character and percentage of pigment employed, while the percentage of pigment itself may, according to known practice, vary according to the pigment itself. Thus, the lighter the color of the pigment, the greater is the quantity of pigment utilized.

The illustrative example of lacquer may thus comprise:—34% of nitro-cellulose and plasticizer, 58% of solvent, and 8% of pigment (in this illustration, the pigment happens to be brown), all by weight; the nitro-cellulose and the plasticizer, in the just stated example, are, on a dry basis, two parts of plasticizer to one part of nitro-cellulose, by weight. The percentages or proportions are approximate.

The 58% of solvent, in the above example, is made up of toluol, ethyl-alcohol, butyl-alcohol, ethyl-acetate and cyclohexanone, in varying or suitable proportions, illustratively substantially equal percentages. As is well known in the art, these solvents may be brought into the ultimate lacquer in various ways, thus, one or more of them may initially function as a solvent for the nitro-cellulose, one or more of them may initially function as a solvent for the plasticizer, being brought together when the nitro-cellulose with its solvent or solvents and the plasticizer with its solvent or solvents are brought into admixture, with the pigment, when a pigment is employed whence the other of the solvents may be added.

The solvents of the above-mentioned illustrative group have different boiling points and hence different rates of evaporation; in the illustration, the lowest boiling point is about 170° F. (77° C.) as an initial boiling point, and the highest or end boiling point is about 266° F. (130° C.).

Accordingly, and with the rubber member 12 at a temperature on the order of 325° F., as stated above in the illustrative example, the above-described illustrative lacquer composition is applied thereto in the manner described above, as in the application chamber 21. But as soon as the coated rubber member 12 emerges therefrom, so as to expose the coating, the heat content within the member 12 acts upon the solvent or solvents in a direction from the innermost portion of the layer toward the outermost, evaporating the solvent from the innermost portion first and progressively in the said direction. Thus, the "setting" takes place first at the innermost portions or layer of the coating, that is, those portions in contact with or closest to the surface of the rubber jacket 12 itself, and last from the outermost layer or portions of the applied coating; thus, the volatilized solvent or solvents or the vapors thereof may be quickly driven off or out of the coating since there is no outer layer or layers of set lacquer which they have to penetrate.

Also, and where the solvent comprises a mixture of solvents having different or graded boiling points or rates of evaporation, a progressive evaporation takes place in that the solvent or solvents of lower boiling point or points evaporate first or more quickly and the solvent or solvents of higher or progressively higher boiling point or points evaporate less quickly and hence progressively later. An exceedingly quick setting results and it is possible that the latter result is aided materially in that the more readily volatile solvent or solvents make use of a smaller fraction of the heat content of the member 12, leaving an adequate supply of heat available to quickly evaporate or volatilize that solvent or those solvents that evaporate less quickly.

In the meantime, and according to the preferred manner of carrying on my method, I gain certain advantages in effecting the application of the coating material to the rubber element immediately upon its emergence from the continuous vulcanizer chamber 17. In this connection, the rubber is not only raised to suitable temperature and a substantial heat content imparted to it, the vulcanizer in this instance acting as a heater, but also is at that stage or point where it is free from oxidation at its surface and is in a substantially semi-vulcanized and semi-plastic state; in that state, it is highly susceptible to the reception of the coating material and more particularly is more susceptible to coaction with that element or ingredient of the coating material which contributes toward the adhesion of the latter to the rubber, namely, the plasticizer in the case of a lacquer. The rubber in this condition is enabled to make an excellent bond with the material, the rubber having in a sense a characteristic analogous to "porosity" and its surface being devoid of oxidized surface film and devoid of surface "tightening"; under these circumstances, a blending or dispersion of the rubber and lacquer, particularly of the plasticizer of the latter, one into the other, occurs, resulting in a bond between the two that is strong and permanent. With the plasticizer, where a lacquer is employed, also contributing flexibility and stretch or elasticity to the coating, the bond achieved as just outlined partakes of the same characteristics and thus, as the ultimate product is bent or flexed or stretched, the coating follows faithfully all such bending, stretching or flexing, as well as contractions, and cracking, crazing, or flaking of the lacquer does not take place.

Thus, I effect an unusually permanent and effective bond between the coating material and the rubber. If one or more additional layers of coating material are to be applied, as by way of the application chamber 27, I effect such additional application preferably in the manner already set forth above, namely, and preferably, just at or subsequent to the completion of the evaporation or volatilization of the volatile compounds of the coating material of the initial or preceding layer of coating, and hence I position the succeeding application chamber at such a distance from the preceding one that the rubber element 12, still at substantial temperature and heat content, enters the succeeding application chamber with its already applied coating material in a substantially completely set but still warm condition. A dependable bond or fusion of the layers is achieved in the manner earlier set forth.

In thus making possible the application of a coating in successive or multiple layers or coating applications, numerous advantages are achieved; for example, I am enabled to load the coating material with a lesser amount of pigment than would be necessary if the desired density of color were to be sought in a single coating application and thus, as to each applied coating, the constituents (such as the plasticizer, where a lacquer is employed) of the coating material and their respective coating characteristics and coactions, are least interefered with.

It is to be understood that my method may be carried on in other ways. Thus, I may effect certain controls of various of the interrelated factors in carrying on my method. For example, in operating with a given coating material, for example, the above-described illustrative lacquer, I may thermally precondition the temperature or heat content of the rubber element 12 to the characteristics of the coating material prior to the application of the latter to the former. This I may effect as by running the rubber element 12 through a suitable heat exchange device diagrammatically indicated in Figure 1 at 29; where, for example, the temperature or heat content, or both, of the member 12 are, upon emergence from the continuous vulcanizer chamber 17, too high or excessive with respect to the characteristics of the coating material, the heat exchange device 29 may comprise a water bath, controlled in any suitable manner, to bring the thermal condition of the element 12 down to the desired level or to a level such as to bring about the desired coaction or rate of coaction between the heat content of the member 12 and the characteristics of the particular coating material employed. To illustrate, let it be assumed that the cross-section of the member to be coated is different from that illustrated in Figure 4, being, for example, greater so as to have a higher thermal capacity or that the operating temperature of the continuous vulcanizer 17 or other suitable heating means is such that the rubber element emerges therefrom at too high a temperature, illustratively a temperature substantially higher than the 325° above assumed for illustrative purposes, then I operate the heat exchange device 29 to abstract heat from the element 12 passing therethrough to a sufficient extent to condition it thermally, as above indicated, to the characteristics of the coating material. Changes in rate of movement of the rubber element 12 may also be effected to achieve some measure of control though, particularly where a continuous vulcanizer is used, it is preferable to suit the remaining steps of my method to the desired or optimum rate of vulcanization, and thereby to avoid diminishing rate of production.

By such control means, as, for example, the heat exchange device 29, I am enable better and more economically to suit a wide variety of operating conditions or requirements. Thus, depending upon the product being vulcanized, its temperature, heat content and rate of movement through the continuous vulcanizer may vary and if under any one set of circumstances these factors are not most effectively suited to the particular coating material, the heat exchange device 29 makes it possible quickly to correlate properly the temperature or heat content to the characteristics of the particular coating material employed and to relate them to the rate of movement of the rubber element being coated. The operator in carrying on my method may thus set or adjust these controls or variables to suit the conditions and invariable factor or factors met with, according to the result desired, and this is preferably done empirically. Thus, for example, if the coating on the rubber element, emerging from the last coating applicator, sets too slowly, the heat exchange device 29 is adjusted to abstract heat from the element 12 at a lesser rate so that its temperature or heat content, as it enters the applicator or applicators, is brought high enough to effect setting at the desired rate or speed.

Where the rubber element to be coated has already been vulcanized, as in reel or pan vulcanizing, its surface is first cleaned (if necessary) in any suitable way and the element is then run through a heat exchange device, analogous to the device 29 of Figure 1, and then run through the applicator or applicators; in such case the heat exchange device 29, under usual conditions of operation, is made to transfer heat to the element 12 to bring its temperature and heat content up to the value appropriate, as will now be clear, to the characteristics of the coating material and the rate of movement of the element through the applicator or applicators. Or, the already vulcanized elongated element might be passed through a suitable heater device, such as a steam chamber like the continuous vulcanizing chamber 17 of Figure 1, and then passed on to the applicator or applicators, but preferably with a control heat exchange device like the device 29 interposed; by way of the latter, controls as earlier above described may be readily effected.

In any case, and due to such factors as the immediate or quick setting of the coating material, the insulated conductor may be practically immediately handled in any suitable or desirable way, as by reeling it up in reels of suitable length. Preferably, and where desired, I may, however, also treat the coating preferably at some point subsequent to its emergence from the last application chamber to give it an external conformation to give it in appearance a simulation to a fabric and preferably also to achieve certain other advantages.

Thus, referring again to Figure 1, I may provide several devices preferably in the form of rollers 30, one of which is shown in larger scale in Figure 3, suitably mounted for rotation and having peripheries exposed to contact the moving rubber element 12 and preferably shaped each to envelope or contact about half of the circumference of the coated rubber element. Thus, as shown in Figure 3, the periphery of the rollers may be concave to conform substantially to the curvature of about half of the cross-sectional shape of the element 12. With two such rollers juxtaposed, practically the entire surface of the coated-rubber element 12 may be operated upon as the latter is moved therebetween.

The peripheral faces of the rollers 30, 30 are conformed or shaped to provide projecting ridges whose apexes are preferably relatively sharp and they may be arranged, as by crossing them, in any suitable way to give the visual effect of a braiding, weaving, or like fabric construction; by way of example, I have, in Figure 3, indicated crisscross or intersecting ridges 31, 32, leaving pocket-like areas 33 therebetween.

As the coated element 12 passes between the opposed rollers 30, 30, suitable means being employed to cause each roller to exert a suitable pressure on the coated rubber element, and with the rollers acting upon the coated rubber element 12 at a suitable distance from the last application chamber, the intersecting ridges 31, 32 cause corresponding lineal depressions to be made in the coating, as at 31ᵃ and 32ᵃ in Figure 4, leaving small portions or areas 33ᵃ of the coating therebetween, the portions 33ᵃ being more or less conformed to the surfacing of the pockets or depressions 33 of the rollers. Where such depressions are preferably generally concave, the areas or portions 33ᵃ of the coating are correspondingly convex. The point of application of the rollers 30, 30, to the moving element 12 is preferably just prior to the substantial setting of the coating itself, and as is now clear, the corresponding distance from the last application chamber may vary according to circumstances. The point should be selected so that the coating material is still appropriately susceptible to being conformed by and to the surfacing of the rollers.

Aside from achieving a simulation of a fabric in appearance, a feature desirable particularly where the coating material is pigmented with certain colors, I achieve also in this manner a desirable coaction of the coating with the flexible or elastic rubber as the latter is flexed or stretched. During flexing, for example, the coating, while otherwise flexible and elastic as earlier above noted, may more easily yield along the lines or depressions 31ᵃ, 32ᵃ (Figure 4), and the latter aid in guarding against crazing or crackling. Any suitable conformation other than that shown in Figure 3 may be given the surface of the rollers 30, 30 and hence given the coating of the rubber element 12; for example, the conformations may include suitable legible indicia, such as identifying data, trade names, or the like.

As earlier above indicated, the application chamber (or chambers) is preferably relatively small and the supply container 24 of Figure 1 may take any suitable form. A preferred arrangement, however, is to utilize for the supply chamber 24 a suitable or standard shipping container, as indicated at 34 in Figure 3, where I have shown the container in the form of a small cylindrical sheet metal drum which may be of any suitable capacity and which in one end, such as the end 35, usually in the form of detachable sheet metal cover, is provided with two threaded openings 36 and 37. A suitable support, diagrammatically indicated at 38, is provided to receive and hold the container 34 which is placed on a support after a suitable pipe-fitting 40, preferably provided with a suitable valve or gate 41, is screwed into the threaded hole 36, a suitable union or coupling 42 coupling the pipe connection 40 to the conduit 25. The other hole 37 may be fitted with a pipe connection 43 preferably provided with a valve member or pet-cock 44, to permit ingress of air as the coating material in the container 34 passes through the pipe connections 40 and 25 to the application chamber. By means of valve 41 or air cock 44, the rate of flow of the coating material to the application chamber may be adjusted.

Such a preferred arrangement permits quick replacement of the supply of coating material and avoids loss of, or change in viscosity of, the coating material, as by evaporation of solvent.

It might also be noted that the diagrammatic relationship above described between the extrusion apparatus 15 and the chamber 17 in which the rubber product, in one mode of carrying on my method, is heated and vulcanized, is illustrative, and that I do not intend to be limited thereto; for example, the extrusion die 16 may be united with or built into the end wall 17ᵃ of the continuous vulcanizer chamber 17, thus to pass the extruded rubber product directly into the chamber 17.

Thus, it will be seen that there has been provided in this invention a method and apparatus in which the various objects hereinbefore noted, together with many thoroughly practical advantages, are successfully achieved. High rate and low cost of production, particularly of rubber insulated conductors, such as lamp cords, with a protective and decorative coating, are achieved, many operating difficulties and disadvantages eliminated, and higher efficiency and a better product result. For example, an instantaneous or substantially instantaneous passing off of the volatile component or components of the coating material and the resultant rapid or quick setting of the coating permit the resultant product to be immediately handled, as by reeling up onto a suitably driven reel diagrammatically indicated at 46, without danger of sticking together and without the need of separating elements.

Also, the high cost, low efficiency, cumbersomeness and other disadvantages of heretofore known practices, such as the drying tower practice, are likewise eliminated. For example, previously attempted practices, requiring the use of drying towers or like cumbersome and slow expedients expose the rubber insulated conductor to the danger of picking up upon its surface foreign matter such as small flakes or splinters, not infrequently conductive or semi-conductive, and where the applied coating of such conductor, still in tacky or unset condition, is exposed, usually in substantial lengths, the unset coating itself acts as an adhesive to pick up such foreign particles; such particles become embedded or incorporated in the coating itself, and sometimes in the underlying rubber insulation to the detriment of the latter, and at times to an extent which has actually caused subsequent insulation failures. According to my invention, such detrimental possibilities can be safely avoided.

Also, the resultant product is superior, for, among other reasons, a lasting and dependable bond between the coating material and the rubber and, moreover, one that well withstands the varying conditions of hard practical use, is dependably effected. The greatly improved character of the coating and the strength and permanence and flexibility of the bond between the coating and the rubber flow from such coactions as I have earlier above outlined, the heated condition of the rubber element giving it a condition analogous to porosity so that the coating material in effect enters the pores and, as distinguished from a simple surface adhesion, which may also be present, an intermingling or mechanical diffusion of the outer portions of the rubber element with the coating material takes place, resulting in a bond of the unique character already noted above.

The instantaneous or substantially instantaneous setting of the coating material, due to the coaction of the heat content of the rubber element with the volatile constituent or constituents of the coating material, also avoids or minimizes the taking place of detrimental or injurious chemical interactions between ingredients on the coating material and the rubber or constituents of the latter; I am enabled so rapidly to drive off volatile constituents that, were they to be harmful in their effect upon the rubber or rubber constituents, or were they to coact with other ingredients of the coating material to detrimentally effect the rubber, they are present for only such a small time period that detrimental chemical action cannot take place or is materially minimized. Thus, I am enabled to better preserve the intended qualities of the rubber itself and thus, also, I am enabled to use constituents in making up the coating material which, according to known practices, could or should not be employed because of detrimental interactions with the rubber or its ingredients.

The permanent character of the bond between the coating and the rubber element contributes toward maintaining the integrity of the coating itself throughout the conditions of normal use of the rubber jacket; thus, air oxidation, sun oxidation and other types of deterioration of rubber due to exposure are reliably guarded against. In thus achieving a lasting flexible and elastic coating, free from cracking, chipping, crazing, or the like, the cord conductor, where exposed to surfaces, like floors, or the like, is protected against the effects on the rubber of such materials as floor oils and waxes, cleaning compounds, including alkali soaps, and the like, and is thus well adapted to withstand the varying conditions of hard practical use.

It will also be seen that there is wide flexibility of control and that widely varying conditions met with in practice may be quickly and effectively provided for. Thus, for example, let it be assumed that the conditions of operation are such that there remains in the coated element, after the coating material has become set, too great a heat content. This might occur, for example, where the coating material requires relatively high temperature, say considerably higher than that illustratively assumed above, with correspondingly substantial heat content in the rubber element, to effect setting of the applied coating material at the desired speed and where the heat is imparted to the rubber element in course of continuous vulcanization; though the coating material is adequate or completely set to permit immediate handling, as earlier above noted, the just vulcanized rubber might, at the just assumed higher ultimate temperature, be too soft or plastic or yielding for certain kinds of immediate handling thereof. I may, therefore, cause the moving and already coated rubber element 12 to pass through a suitable heat-abstracting device, such as a water bath, preferably at point just in advance of the driven capstan 47, the latter being driven and suitably synchronized with the extrusion apparatus 15 in any suitable or known manner, usually passing the finished conductor onto a reel, such as the above-mentioned reel 46. In Figure 1 the heat exchange device for bringing the temperature and heat content of the finished or coated element to the desired magnitude is diagrammatically indicated at 48 just in advance of the capstan roller 47.

By way of further example, let it be assumed that it is desired that a succeeding application of coating material or other covering take place so that it is superimposed upon the preceding coating while the latter is still unset; depending upon the character of the preceding quoted material, it might have a tacky or adhesive quality, prior to complete setting, and which it is desired to utilize. In such case, I may make the second application, as already indicated above, at such point in the travel of the member 12, after its emergence from, for example, application chamber 21, where complete setting has not yet taken place; thus, with respect to the earlier above assumed illustration, where the superimposed covering is in the form of another layer of coating material, the application chamber of the latter, such as chamber 27, is spaced more closely to the application chamber 21 than the above assumed spacing of two feet. Or, by control of the heat content, as by means of the heat exchange device 29, the heat content may be somewhat diminished so as to effect a correspondingly lower rate of setting.

As many possible embodiments may be made of the mechanical features of the above invention and as the art herein described might be varied in various parts, all without departing from the scope of the invention, it is to be understood that all matter hereinabove set forth, or shown in the accompanying drawing, is to be interpreted as illustrative and not in a limiting sense.

I claim:

1. In a method for continuously applying to a rubber element, like the rubber covering of a conductor, a viscous coating material having a volatile constituent and effecting an intimate bond therebetween, the steps which comprise continuously extruding vulcanizable rubber compound onto a longitudinally moving conductor, feeding the conductor with the compound thereon throughout a continuous vulcanizer chamber provided with a suitable heating medium to substantially vulcanize the rubber compound and to impart to the conductor and its covering a heat content at substantially the temperature of vulcanization, applying to the surface of the rubber covering as it continues to move and while still in heated condition a coating material the volatile constituent of which is substantially instantaneously volatilized by the heat content of the rubber element, withdrawing heat from the rubber covering and conductor prior to applying the coating material to suit the heat content of the rubber covering and conductor to the evaporation characteristic of the volatile constituent of the coating material and thereby determining the rate of setting of the coating material, and reeling up the rubber covered conductor with the set coating on the rubber.

2. In a method for continuously applying to a rubber element, like the rubber covering of a conductor, a viscous coating material having a volatile constituent and effecting an intimate bond therebetween, the steps which comprise effecting continuous movement of the conductor at a suitable rate, extruding rubber compound onto the conductor as it moves, subjecting the extruded rubber compound to heat treatment for a sufficient length of time to substantially vulcanize it and to impart to the conductor and the compound a heat content, then applying to the exterior of the rubber covering a coating material in viscous form and utilizing the heat content of the rubber covering and conductor to quickly volatilize the volatile constituent of the coating material to effect quick setting of the material in the form of a coating.

3. A method as claimed in claim 2 which includes the additional step of correlating the speed of movement of the conductor with its extruded covering and the heat content of the latter to effect setting of the coating material within the desired distance of travel from the point of application of the coating material.

4. A method as claimed in claim 2 which includes also the step of regulating the heat content of the rubber covering and conductor to suit it to the evaporation characteristics of the volatile constituent of the coating material.

5. In a method for continuously applying to a rubber element, like the rubber covering of a conductor, a viscous coating material having a volatile constituent and effecting an intimate bond therebetween, the steps which comprise effecting continuous movement of the conductor at a suitable rate, extruding rubber compound onto the conductor as it moves, subjecting the extruded rubber compound to heat treatment for a sufficient length of time to substantially vulcanize it and to impart to the conductor and the compound a heat content, then applying to the exterior of the rubber covering a coating material in viscous form and utilizing the heat content of the rubber covering and conductor to quickly volatilize the volatile constituent of the coating material to effect quick setting of the material in the form of a coating, and superimposing upon the substantially set coating and prior to the complete dissipation of the heat content of the rubber covering and conductor another coating of coating material and utilizing heat from the remainder of said heat content to set said additional coating of coating material.

6. In a method for continuously applying to a vulcanized rubber element, like the rubber covering of a conductor, a viscous coating material having therein at least one volatile constituent and effecting an intimate bond therebetween, the steps which comprise effecting movement at a suitable rate of speed of the substantially vulcanized rubber element heated to a temperature sufficient to render it porous and capable of volatilizing the volatile constituent of said coating material, and during movement and at one point in its path applying to the rubber element a coating of the viscous coating material containing the volatile constituent while the rubber element is in said heated condition, thereby effecting relatively quick setting of the applied coating.

7. In a method for continuously applying to a rubber element, like the rubber covering of a conductor, a viscous coating material having a volatile constituent and effecting an intimate bond therebetween, the steps which comprise continuously extruding, at a suitable rate of speed, rubber compound in the cross-section of said rubber element, subjecting the extruded compound, as it continues to move, to heat treatment for a sufficient length of time to substantially vulcanize it to form said rubber element and to thereby impart to it a heat content appropriate to volatilize the volatile constituent of said coating material, and while the rubber element is still in heated condition and still moving applying to the rubber element a coating of the viscous coating material containing a volatile constituent, thereby effecting relatively quick setting of the applied coating.

8. As an article of manufacture, a rubber element having a flexible coating thereon, said coating being bonded to the rubber element as a result of the application to the rubber element of the material of the coating in initially viscous liquid form in which it includes a constituent that contributes adhesiveness to the coating material and a sufficient amount of volatile constituent that acts as a solvent for the ingredients of the coating material, with the rubber element in a pre-heated condition so that its surface portions have a physical condition analogous to porosity so that said viscous liquid coating material becomes dispersed into the pores of the rubber element and the heat content of the latter acts upon the applied coating material in a direction from the innermost portions of the coating toward the outermost to effect initial bonding followed by volatilization of the volatile constituent in the said direction.

9. An apparatus for applying a coating material in semi-liquid form to a rubber element and effecting a bond therebetween, comprising means for effecting movement of the rubber element along a desired path, means operating at one point in said path to apply to the rubber element as it moves along a heat-responsive coating material in substantially viscous liquid form and comprising a constituent contributing adhesiveness thereto and a sufficient amount of volatile constituent that acts as a solvent for the ingriedients of the coating material to render the latter sufficiently liquid and means for conditioning said rubber element for bolding with the coating material and for heat-treating the applied coating material to set it and comprising means for continuously extruding rubber compound in the form of said rubber element and at substantially the aforesaid rate of movement of the latter, for thereby preforming said rubber element, and a vulcanizing chamber interposed between said extrusion means and the point in said path of movement where said coating material is applied for substantially vulcanizing the extruded rubber compound to substantially complete the formation of said rubber element and to present the surface portions thereof in substantially porous condition for dispersion into its pores of the coating material and to impart to said rubber element a heat content sufficient to heat-treat the subsequently applied coating of coating material to effect relatively rapid volatilization of the volatile constituent and relatively quickly set the applied coating.

10. An apparatus for applying a heat-responsive coating material in viscous liquid form to a rubber element and effecting a setting thereof, comprising means for effecting movement of the rubber element along a desired path, a steam chamber at one point in said path and through which said rubber element moves for imparting to the rubber element a substantial heat content, and a plurality of applying devices spaced along said path subsequent to said one point, each operating to apply a layer of heat-responsive coating material in viscous liquid form to the heated rubber element as it moves along, thereby building up a coating on said element in a plurality of superimposed layers, the spacing between said plurality of applying devices being sufficient to permit the heat content of said rubber element to effect substantial setting successively of the superimposed applied layers of coating material, whereby the layer applied by each applying device is substantially set but maintained heated as it reaches the succeeding applying device to have a layer superimposed upon it.

11. An apparatus of the character described, comprising means for effecting movement of a rubber element along a desired path, heat exchange means operating upon said rubber element at one point in its path for heating the rubber element to a temperature sufficient to render its surface portions substantially porous for reception of coating material and for giving the rubber element a heat content sufficient to effect volatilizing of the volatile constituent of the coating material, and means for applying coating material to the rubber element at another point in its path, said applying means comprising a relatively small application chamber for containing a relatively small quantity of coating material, whereby heat loss from the heat content of the rubber element to the mass of coating material in the chamber is minimized and loss of volatile constituent or constituents prevented, said application chamber having means for passing said rubber element, as it moves, therethrough and through the coating material contained therein, and means for feeding coating material to said application chamber, said means comprising a container vented to be open to the atmosphere and having disconnectable pipe-like connections with said application chamber for conducting material from said container to said application chamber by gravity.

12. A method as claimed in claim 6 in which the step of applying the coating material is carried out by running the heated rubber element through a relatively small mass of the coating material contained in a correspondingly small-sized application chamber, moving the rubber element through the application chamber at a sufficiently high rate of speed so that heat loss from the heat content of the rubber element to the mass of coating material in said chamber is substantially inconsequential thereby to negative volatilization of the volatile constituent of the material in the application chamber, and feeding coating material from a suitable source of supply to said application chamber to maintain said small mass of coating material therein substantially constant.

13. The method of applying a flexible coating to and bonding it with a rubber element which comprises the steps of heat-treating the rubber element to give its surface portions a physical condition analogous to porosity and to give the rubber element a heat content sufficient to effect volatilizing of the volatile constituent of the coating material, applying to the element a coating material in viscous liquid form and having therein a constituent contributing adhesiveness thereto a..d a sufficient amount of volatile constituents of differing boiling points that act as a solvent for the ingredients of the coating material to render the latter sufficiently liquid to become dispersed into the pores of the surface portion of the rubber element, the heat content of the rubber element effecting volatilizing of the volatile constituents successively according to their different rates of volatilization due to their different boiling points and in a direction from the interior of the applied coating toward the exterior thereof thereby quickly setting the applied coating material.

14. In a method for continuously applying to a vulcanized rubber element like the covering of a conductor, a viscous coating material having at least one volatile constituent and effecting an intimate bond therebetween, the steps which comprise effecting movement at a suitable rate of speed of a heated substantially vulcanized rubber element, during movement of said element effecting heat exchange therebetween and a suitable medium to adjust the heat content of the rubber element to a magnitude appropriate to render at least surface portions of the rubber element substantially porous and to be capable of volatilizing the volatile constituent of the coating material, and then applying, during movement of the rubber element, a coating of the viscous coating material containing the volatile constituent to effect entry of the coating material into the surface pores and by the adjusted heat content in the rubber element effecting volatilizing of the volatile constituent to bring about setting of the applied coating.

15. The method of applying a flexible coating to and bonding it with a rubber element which comprises heat-treating the rubber element to give its surface portions a physical condition analogous to porosity and to give the rubber element a heat content sufficient to effect volatilizing of the volatile constituent of the coating material, and applying a coating material in viscous liquid form that comprises a constituent that contributes adhesiveness to the coating material and a sufficient amount of a volatile constituent that acts as a solvent for the ingredients of the coating material to render the latter sufficiently liquid to enter the pores of the surface portion of the rubber element, the heat content of the rubber element effecting volatilizing of the volatile constituent in a direction from the interior of the applied coating toward the exterior thereof.

16. An apparatus for applying to a rubber element a coating material in viscous liquid form that comprises a constituent that contributes adhesiveness to the coating material and a sufficient amount of a volatile constituent that acts as a solvent for the ingredients of the coating material to render the latter sufficiently liquid, and for effecting a bond between said rubber element and said coating material, comprising means for effecting movement of the rubber element along a desired path, means operating at one point in said path for conditioning said rubber element to receive the coating material and for bonding therewith, said conditioning means comprising a steam chamber having inlet and outlet means through which the rubber moves to become heated in said chamber without production of an oxidized surface film and to a temperature sufficient to give its surface portions a condition analogous to porosity and to give the rubber element a heat content sufficient to effect volatilizing of the volatile constituent of the coating material, and means operating at a subsequent point in the path of movement of the rubber element to apply to the heated non-oxidized rubber element a coating of the said viscous liquid coating material, whereby the latter is dispersed into the pores of the rubber element and volatilization, by the heat content of said rubber element, of the volatile constituent of said coating material in a direction from the innermost portions of the coating toward the outermost takes place to effect setting of the coating material.

17. In a method for continuously applying to a rubber element a viscous coating material having a volatile constituent and effecting an intimate bond therebetween, the steps which comprise effecting continuous extrusion of rubber compound into the desired cross-section and at a suitable rate for thereby preforming said rubber element, subjecting the extruded rubber compound to heat treatment for a sufficient length of time to substantially vulcanize it and to impart to the resultant rubber element a heat content sufficient to effect volatilizing of the volatile constituent of the coating material, and then applying to the exterior of the said rubber element a coating of the viscous coating material and utilizing the heat content of the rubber element to quickly volatilize the volatile constituent of the applied coating material to effect quick setting thereof.

18. The method of applying a flexible coating to and bonding it with a rubber element which comprises forming the element out of rubber compound, subjecting the formed rubber compound to heat treatment for a sufficient length of time to substantially vulcanize it and thereby produce the rubber element with its surface portions in a physical condition analogous to porosity and thereby giving the rubber element a heat content sufficient to effect volatilizing of the volatile constituent of the coating material, and applying a coating material in viscous liquid form that comprises a constituent that contributes adhesiveness to the coating material and a sufficient amount of a volatile constituent that acts as a solvent for the ingredients of the coating material to render the latter sufficiently liquid to enter the pores of the surface portion of the rubber element, and utilizing the heat content of the rubber element to effect volatilizing of the volatile constituent in a direction from the interior of the applied coating toward the exterior thereof.

CHARLES W. ABBOTT.